US012645093B2

(12) United States Patent
Kumar et al.

(10) Patent No.: US 12,645,093 B2
(45) Date of Patent: Jun. 2, 2026

(54) OPTICALLY SPARSE PRIMARY APERTURE FOR HIGH SPATIAL RESOLUTION IMAGING

(71) Applicant: Tata Consultancy Services Limited, Mumbai (IN)

(72) Inventors: Achanna Anil Kumar, Bangalore (IN); Avyarthana Ghosh, Pune (IN); Tapas Chakravarty, Kolkata (IN); Arpan Pal, Kolkata (IN); Jayavardhana Rama Gubbi Lakshminarasimha, Bangalore (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 271 days.

(21) Appl. No.: 18/501,717

(22) Filed: Nov. 3, 2023

(65) Prior Publication Data

US 2025/0020905 A1      Jan. 16, 2025

(30) Foreign Application Priority Data

Jul. 11, 2023    (IN) .............................. 202321046439

(51) Int. Cl.
*G02B 27/58*      (2006.01)
*G02B 23/06*      (2006.01)
G02B 17/00      (2006.01)

(52) U.S. Cl.
CPC ............. *G02B 27/58* (2013.01); *G02B 23/06* (2013.01); *G02B 17/002* (2013.01)

(58) Field of Classification Search
CPC ...... G02B 23/06; G02B 7/183; G02B 17/002; G02B 27/0087; G02B 27/58; G02B 2207/129
See application file for complete search history.

(56) References Cited

U.S. PATENT DOCUMENTS 4,797,682 A * 1/1989 Klimczak .............. H01Q 21/22
                                                                343/777
4,825,062 A     4/1989 Rather et al.
                    (Continued)

FOREIGN PATENT DOCUMENTS

CN        101315466 A  * 12/2008
EP        0438664 A2      7/1991
FR        2858425 A1  *  2/2005  ............. G02B 27/58

OTHER PUBLICATIONS

Fiete et al., "Image quality of sparse-aperture designs for remote sensing," Opt. Eng. 41(8) 1957â1969 (Aug. 2002). (Year: 2002).*
                    (Continued)

*Primary Examiner* — Nicholas R. Pasko
(74) *Attorney, Agent, or Firm* — Finnegan, Henderson, Farabow, Garrett & Dunner, LLP

(57)                ABSTRACT
Existing telescope designs require increasing number of sub-apertures for optimum performance. However, with the increasing number of sub-apertures, number and amplitudes of sidelobes increase. Along with that, increase in the primary maxima, resulting trade-off of imaging quality. An optically sparse primary aperture for high spatial resolution imaging is disclosed, comprising central sub-aperture and plurality of peripheral sub-apertures, the peripheral sub-apertures form concentric patterns around the central sub-aperture, Size of the central sub-aperture and the plurality of peripheral sub-apertures is in a proportionate relationship. Further, the plurality of the peripheral sub-apertures forms at least two concentric zones, wherein each concentric zone has equal number peripheral sub-apertures from among the plurality of peripheral sub-apertures, and the sizes of the peripheral sub-apertures in each two adjacent concentric zones have a proportionate relationship. This way there is
                    (Continued)

significant side lobe suppression compensating the imaging performance loss due to reduced aperture area.

3 Claims, 4 Drawing Sheets

(56)                    References Cited

U.S. PATENT DOCUMENTS

| | | | | |
|---|---|---|---|---|
| 4,967,077 | A | * | 10/1990 | Watson .................. H01Q 21/20 |
| | | | | 250/237 R |
| 5,919,128 | A | * | 7/1999 | Fitch .................. A61B 1/00193 |
| | | | | 600/176 |
| 10,431,900 | B2 | * | 10/2019 | Angeletti ........... G05B 19/4097 |

OTHER PUBLICATIONS

Liu et al., "Novel array configuration and its optimization for sparse aperture imaging systems," Optical Engineering 50(5), 053202 (May 2011). (Year: 2011).*

Miller et al., "Optical sparse aperture imaging," Applied Optics, vol. 26, No. 23, Aug. 10, 2007, 5933-5943. (Year: 2007).*

Watson et al., "Sidelobe reduction via multiaperture optical systems," Applied Optics, vol. 28, No. 4, Feb. 15, 1989, 687-693. (Year: 1989).*

Zhang et al., "The optimal design of a binaural sparse-aperture system," Results in Physics, vol. 16, article id. 102970, Mar. 2020, DOI: 10.1016/j.rinp.2020.102970. (Year: 2020).*

Padin, Stephen, "Design considerations for a highly segmented mirror", Title of the item: Applied Optics, Date: 2003, vol. 42; Issue: 16, Publisher: Optical Society of America, Link: https://opg.optica.org/ao/abstract.cfm?uri=ao-42-16-3305.

* cited by examiner

OPTICALLY SPARSE PRIMARY APERTURE FOR HIGH SPATIAL RESOLUTION IMAGING

PRIORITY CLAIM

This U.S. patent application claims priority under 35 U.S.C. § 119 to: Indian patent application No. 202321046439, filed on Jul. 11, 2023. The entire contents of the aforementioned application are incorporated herein by reference.

TECHNICAL FIELD

The disclosure herein generally relates to telescopes, and, more particularly, to optically sparse primary aperture mirrors for space-based earth-observation telescopes.

BACKGROUND

Scientific objectives from earth observation to astronomy require high-resolution observations from space-based platforms. However, designing space telescopes with large primary apertures to achieve high-resolution and high Signal-to-Noise Ratio observations, especially for those operating in longer wavelengths (like Thermal Infrared, TIR), is not feasible due to difficulties in manufacturing, launching, and post-deployment stabilizing.

The most common technique for achieving high spatial resolution Earth-observation images from space-based telescopes is to increase the collecting area viz: the primary aperture size. At a given wavelength (say, 10 µm), as the primary aperture diameter is increased from a few centimeters to a few tens of meters, the corresponding PSF becomes sharper, and the image resolution and contrast improve. An alternative to the challenge of deploying large mirrors in space is the use of a space-deployable optically sparse mirror with smaller segments. Such kind of OSA mirrors can be easily manufactured and reduces the mass budget for space-missions. A conventional partially filled primary aperture has the limitation of sidelobes that keep on increasing as the number of sub-apertures are increased, gradually obliterating the finer features and low contrast images. With increasing number of sub-apertures, the number, and amplitudes of the sidelobes increase along with that of the primary maxima, resulting in a trade-off of the imaging quality.

SUMMARY

Embodiments of the present disclosure present technological improvements as solutions to one or more of the above-mentioned technical problems recognized by the inventors in conventional systems. For example, in one embodiment, an optically sparse primary aperture for high spatial resolution imaging is provided. The optically sparse primary aperture includes a central sub-aperture, and a plurality of peripheral sub-apertures encompassing the central sub-aperture. Size of the central sub-aperture and the plurality of peripheral sub-apertures is in a proportionate relationship. Further, the plurality of the peripheral sub-apertures forms at least two concentric zones, wherein each concentric zone has equal number peripheral sub-apertures from among the plurality of peripheral sub-apertures, and the sizes of the peripheral sub-apertures in each two adjacent concentric zones have a proportionate relationship.

In an embodiment of the optically sparse primary aperture, the plurality of peripheral sub-apertures is equally distributed in three concentric zones, wherein, a first concentric zone having the peripheral sub-apertures with diameter one third of that of the diameter of the central sub-aperture, a second concentric zone having the peripheral sub-apertures with diameter one third of that of the diameter of the central sub-aperture, and a third concentric zone having the peripheral sub-apertures with diameter equal to the diameter of the central sub-aperture.

In another embodiment of the optically sparse primary aperture, the plurality of peripheral sub-apertures is equally distributed in three concentric zones and size of peripheral sub-aperture in each concentric zone is reduced based on one or more coefficients of the Taylor expansion series, for In, such that, the peripheral sub-apertures in a first concentric zone among the three concentric zones have a diameter half that of the central sub-aperture, the peripheral sub-apertures in a second concentric zone among the three concentric zones have the diameter one third that of the central sub-aperture, and the peripheral sub-apertures in a third concentric zone among the three concentric zones have the diameter one-fourth that of the central sub-aperture.

In another embodiment of the optically sparse primary aperture, the plurality of peripheral sub-apertures is equally distributed in three concentric zones and size of the plurality of peripheral sub-apertures in each of the three concentric zones is reduced as per one or more coefficients of a Taylor expansion series, for inverse of tan function, such that, the peripheral sub-apertures in a first concentric zone among the three concentric zones have a diameter equal to one-third of the central sub-aperture, the peripheral sub-apertures in a second concentric zone among the three concentric zones have the diameter equal to one-fifth that of the central sub-aperture, and the peripheral sub-apertures in a third concentric zone among the three concentric zones have the diameter equal to one-seventh that of the central sub-aperture.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
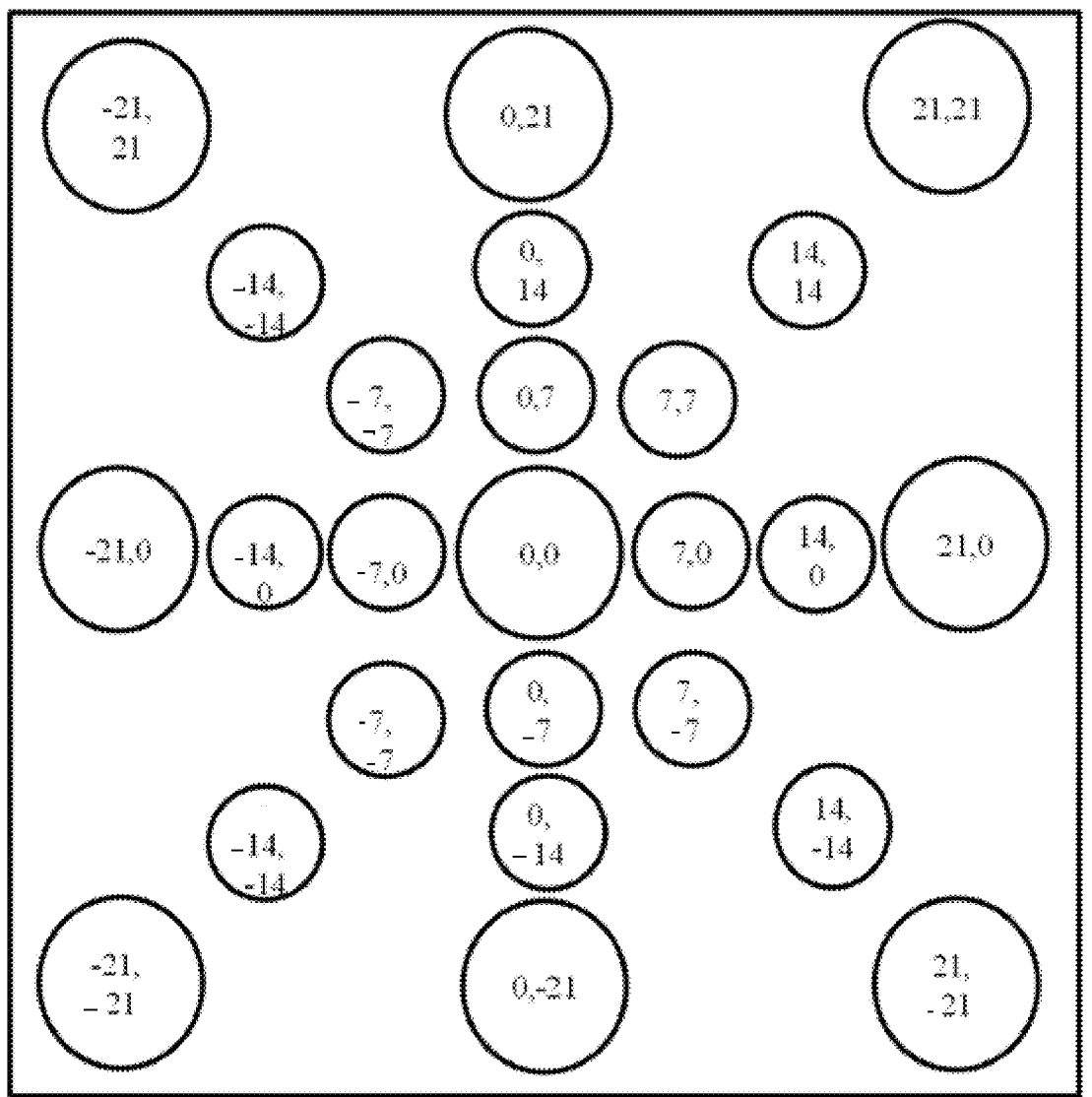
FIG. 1 illustrates a first design of an optically sparse primary aperture according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Most common technique for achieving high spatial resolution Earth-observation images from space-based telescopes is to increase the collecting area viz; the primary aperture size. At a given wavelength (say, 10 µm), as the primary aperture diameter is increased from a few centimeters to a few tens of meters, the corresponding PSF becomes sharper, and the image resolution and contrast improve. An alternative to the challenge of deploying large mirrors in space is the use of a space-deployable optically sparse mirror with smaller segments. Such kind of OSA mirrors can be easily manufactured and reduces the mass budget for space-missions. A conventional partially filled primary aperture has the limitation of sidelobes that keep on increasing as the number of sub-apertures are increased, gradually obliterating the finer features and low contrast images. With increasing number of sub-apertures, the number, and amplitudes of the sidelobes increase along with that of the primary maxima, resulting in a trade-off of the imaging quality.

In order to address these challenges, the embodiments disclosed herein provide an optically sparse primary aperture for high spatial resolution imaging. The optically sparse primary aperture includes a central sub-aperture, and a plurality of peripheral sub-apertures encompassing the central sub-aperture. Size of the central sub-aperture and the plurality of peripheral sub-apertures is in a proportionate relationship. Further, the plurality of the peripheral sub-apertures forms at least two concentric zones, wherein each concentric zone has equal number peripheral sub-apertures from among the plurality of peripheral sub-apertures, and the sizes of the peripheral sub-apertures in each two adjacent concentric zones have a proportionate relationship. Three different designs/configurations of the optically sparse primary aperture have been disclosed herein, which have been found to be facilitating quality imaging while remaining light-weight, and configurable.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 2:
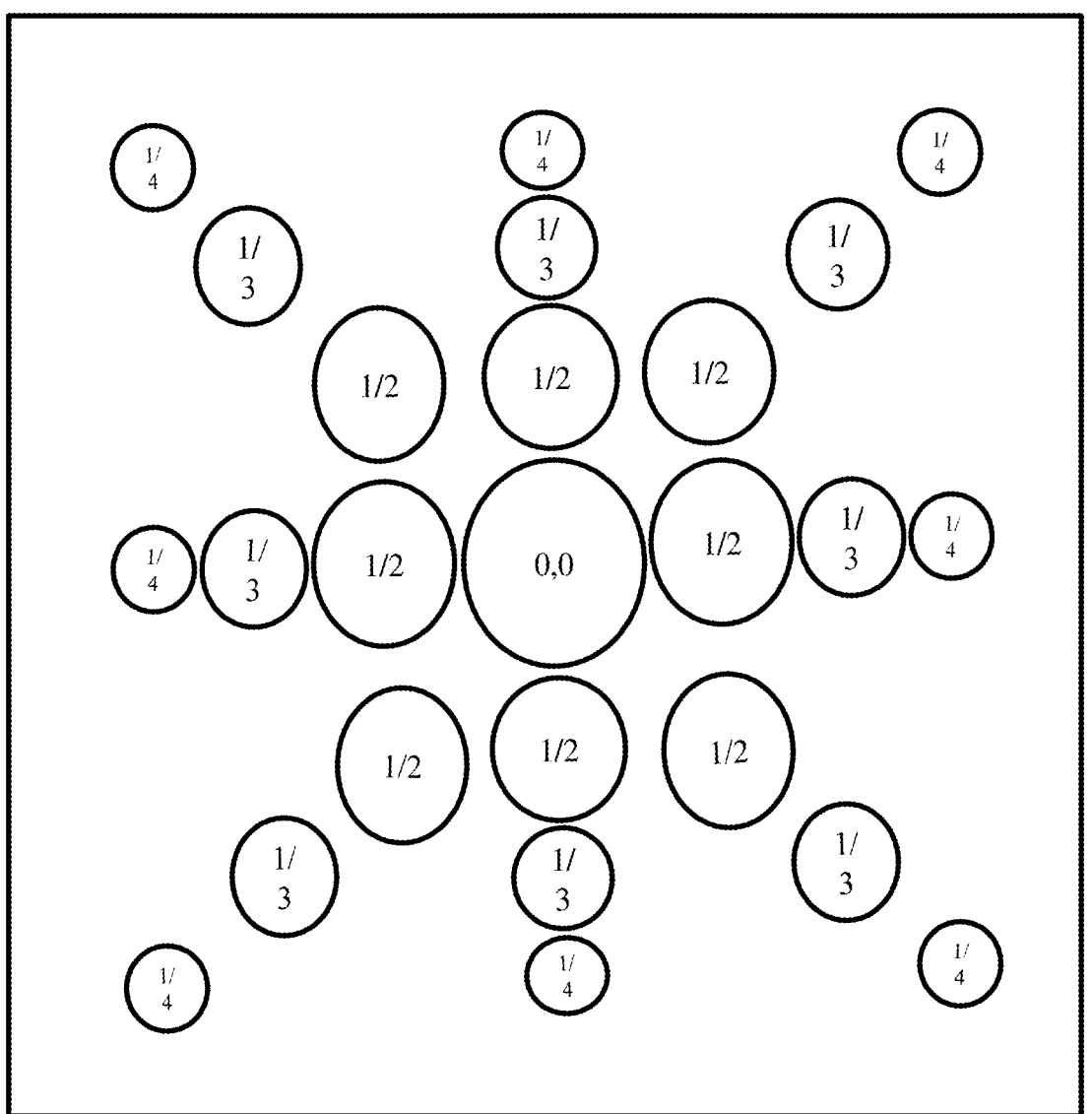
FIG. 2 illustrates a second design of the optically sparse primary aperture according to some embodiments of the present disclosure.
Figure 3:
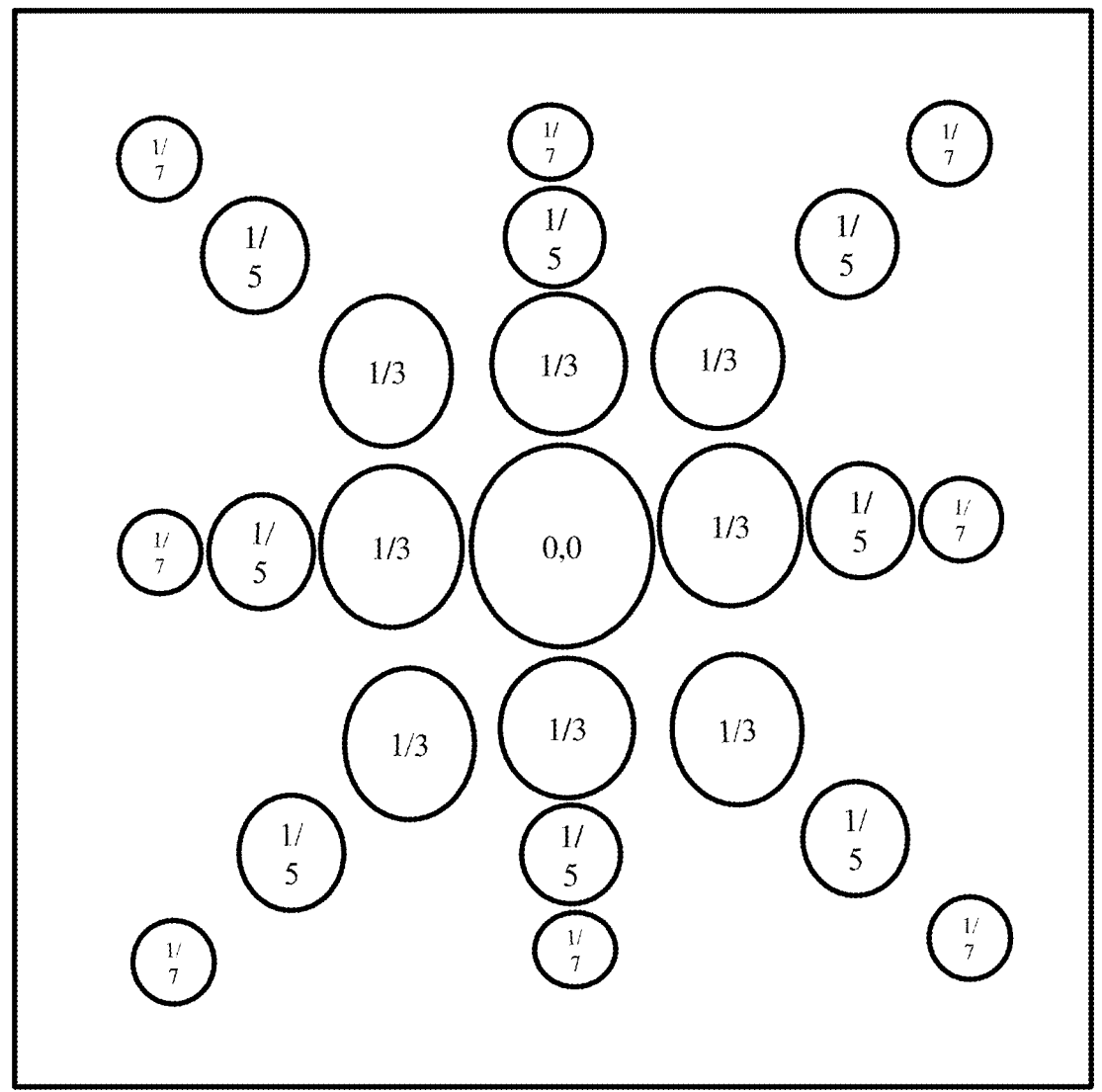
FIG. 3 illustrates a third design of the optically sparse primary aperture according to some embodiments of the present disclosure.
Figure 4:
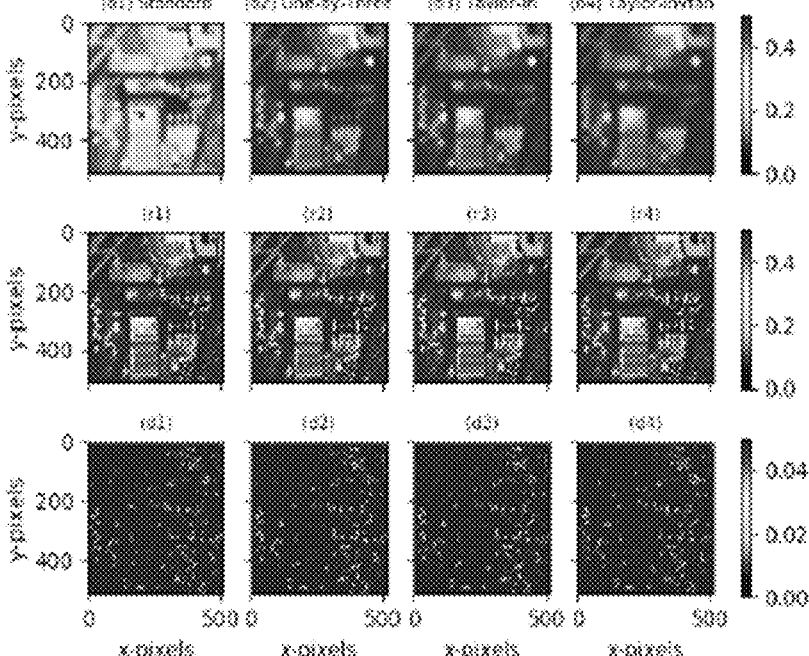
FIG. 4 illustrates example results obtained by the first design, the second design, and the third design, of the optically sparse primary aperture, according to some embodiments of the present disclosure.

The optically sparse primary aperture includes a central sub-aperture 101, and a plurality of peripheral sub-apertures 102 encompassing the central sub-aperture. Size of the central sub-aperture and the plurality of peripheral sub-apertures is in a proportionate relationship. The plurality of the peripheral sub-apertures forms at least two concentric zones. Each concentric zone has equal number of peripheral sub-apertures from among the plurality of peripheral sub-apertures, and the sizes of the peripheral sub-apertures in each two adjacent concentric zones have a proportionate relationship. Three different designs or configurations of the optically sparse primary aperture are depicted in FIGS. 1 through 3.

The configuration in FIG. 1, also referred to as a first design, depicts that the plurality of peripheral sub-apertures 102 is equally distributed in three concentric zones. A first concentric zone of the three concentric zones has the peripheral sub-apertures with diameter one third of that of the diameter of the central sub-aperture, a second concentric zone of the three concentric zones has the peripheral sub-apertures with diameter one third of that of the diameter of the central sub-aperture, and a third concentric zone of the three concentric zones has the peripheral sub-apertures with diameter equal to the diameter of the central sub-aperture. In this configuration, the central sub-aperture has a diameter of 0.006 m. A Point Spread Function (PSF) profile of this configuration indicated that an associated primary maxima coincides with that of a standard design with significant sidelobe suppression than any of the equal-sized sub-aperture designs. A fill-factor for this configuration with respect to that of the standard OSA is defined as:

$$\text{Fill Factor} = (Nsub * dsub)/(Nstandard * dstandard), \tag{1}$$

Where, $N_{sub}$ and $d_{sub}$ represent the number of segments and diameter of each segment for the design. $N_{standard}$ and $d_{standard}$ represent the same for the standard configuration.

Considering $N_{standard}$=12 with $d_{standard}$=0.01 m, the fill factor for the configuration in FIG. 1 is ~33%. With an assumption that the sub-apertures in both these configurations have unit thickness and made of the same material, the corresponding mass ratio was found to be about ⅓rd of the standard design. Also, in comparison with a standard configuration, weight of support framework required for the configuration in FIG. 1 was found to be less by 70%. This is with an assumption that the cross-section and material of the supporting rods are same in both the configurations.

The configuration in FIG. 2, also referred to as a second design, depicts that the plurality of peripheral sub-apertures is equally distributed in three concentric zones. Size of peripheral sub-aperture in each concentric zone is reduced based on one or more coefficients of the Taylor expansion series, for In, such that, the peripheral sub-apertures in a first concentric zone among the three concentric zones have a diameter half that of the central sub-aperture, the peripheral sub-apertures in a second concentric zone among the three concentric zones have the diameter one third that of the central sub-aperture, and the peripheral sub-apertures in a third concentric zone among the three concentric zones have the diameter one-fourth that of the central sub-aperture.

The configuration in FIG. 2 was found to be resulting in a mass (and, fill factor) reduction to 37% of that of the standard configuration, and could be implemented using the same number of peripheral apertures as in the configuration in FIG. 1, with the central aperture of size 0.01 m. The total number of peripheral apertures is 25, where 24 apertures are arranged in sets of 8 around the central aperture and at the same coordinates as in the configuration in FIG. 1.

The PSF profile of the configuration in FIG. 2 indicated that it is very close to that of a 12 sub-aperture configuration where each segment is 0.01 m. However, the PSF is broader with the sidelobes shifted significantly away from the peak. However, the mass of the support framework for this configuration is ~80% to that of the standard configuration.

The configuration in FIG. 3, also referred to as third design, depicts that the plurality of peripheral sub-apertures is equally distributed in three concentric zones and size of the plurality of peripheral sub-apertures in each of the three concentric zones is reduced as per one or more coefficients of a Taylor expansion series, for inverse of tan function, such that, the peripheral sub-apertures in a first concentric zone among the three concentric zones have a diameter equal to one-third of the central sub-aperture, the peripheral sub-apertures in a second concentric zone among the three concentric zones have the diameter equal to one-fifth that of the central sub-aperture, and the peripheral sub-apertures in a third concentric zone among the three concentric zones have the diameter equal to one-seventh that of the central sub-aperture.

In this configuration, the diameter of the peripheral sub-apertures reduces from the central sub-aperture according to the coefficients of the Taylor expansion series for $\tan^{-1}(x)$ i.e., ⅓, ⅕, ⅐. The central sub-aperture has a diameter of 0.02 meter and the peripheral ones steadily decrease with increasing distance from the central aperture. The PSF profile of this design, however, indicated that the primary maximum is much stronger (lying somewhere between the PSFs of a 17 sub-apertures and a 20 sub-apertures model) along with maximum smoothing out of the sidelobes. The configuration in FIG. 3 is found to have a resultant fill factor ~80% of that of the 12-aperture standard configuration. The corresponding mass of the support framework is found to be nearly equal to that of the standard configuration.

Experimental Data and Imaging Performance:

The configurations in FIGS. 1 through 3 have less collecting area than the standard configuration. To do a comparative study of their imaging quality, an input panchromatic image from the Skysat data archive of the Birmingham airport scene on 9 Apr. 2020 with a ground spatial distance of 81 cm (https://www.satimagingcorp.com/satellitesensors/skysat-1/) was used. This input image was rescaled to a coarser resolution matching an imaging system with pixel size 10 μm, focal length 0.1 m and operating at 500 km. In the top panels of FIG. 4 (i.e., panels o1, o2, o3 and o4), the image observed (using convolution with the PSF) by the standard configuration, and the configurations in FIGS. 1 through 3, respectively are depicted. The observed images were found to lack clarity for low collecting area designs.

As a part of the image reconstruction technique (with deconvolution), a standard approach considered demonstrated that the quality of an image captured by a partially filled system can be improved at the post-processing level by incorporating the PSF of a large monolithic mirror. Taking this into consideration, the restored images are shown in panels r1, r2, r3 and r4. It was seen that in all these three configurations, most features have been reconstructed back with equally good contrast and resolution as the standard configuration. It was also noted that the Peak-Signal-to-Noise-Ratio (PSNR) for the standard configuration is 38.95 dB, which reduced to about 38.60, 38.73 and 38.86 dB for the configurations in FIG. 1, FIG. 2, and FIG. 3 respectively. The Structural Similarity Index Measure (SSIM) also was found to be reducing gradually from 0.994 (for standard design) to 0.982, 0.985 and 0.991 for the configurations in FIG. 1, FIG. 2, and FIG. 3 respectively.

Bottom panels (d1, d2, d3 and d4) plot the difference of the restored images with that of the input image. From the results, it can be observed that the performance deterioration is marginal while providing a considerable gain in terms of the overall weight.

The three designs/configurations may be used for high spatial resolution imaging or any other similar imaging applications. For example, the designs maybe of a telescope that is used for the high spatial resolution imaging.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of large aperture requirements of telescopes for intended performance. The embodiment thus provides three configurations for optimum imaging performance of telescopes.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An optically sparse primary aperture for high spatial resolution imaging, comprising:

a central sub-aperture; and a plurality of peripheral sub-apertures, wherein the plurality of peripheral sub-apertures form concentric patterns around the central sub-aperture, wherein, size of the central sub-aperture and the plurality of peripheral sub-apertures is in a proportionate relationship, and the plurality of the peripheral sub-apertures forms at least two concentric zones, wherein each concentric zone has equal number of peripheral sub-apertures from among the plurality of peripheral sub-apertures, and the sizes of the peripheral sub-apertures in each two adjacent concentric zones have a proportionate relationship, wherein in the concentric zone, the plurality of peripheral sub-apertures lie at an equal distance from the central sub-aperture, wherein the plurality of peripheral sub-apertures is equally distributed in three concentric zones, comprises:

a first concentric zone having the peripheral sub-apertures with diameter one third of that of the diameter of the central sub-aperture, wherein the plurality of peripheral sub-apertures of the first concentric zone are at a first distance from the central sub-aperture;

a second concentric zone having the peripheral sub-apertures with diameter one third of that of the diameter of the central sub-aperture, wherein the plurality of peripheral sub-apertures of the second concentric zone are at a second distance from the central sub-aperture; and a third concentric zone having the peripheral sub-apertures with diameter equal to the diameter of the central sub-aperture, wherein the plurality of peripheral sub-apertures of the third concentric are at a third distance from the central sub-aperture, wherein the first distance is less than the second distance, and the second distance is less than the third distance.

2. The optically sparse primary aperture of claim 1, wherein the plurality of peripheral sub-apertures is equally distributed in the three concentric zones and size of peripheral sub-aperture in each concentric zone is reduced such that, the plurality of peripheral sub-apertures at the first distance from the central aperture in the first concentric zone among the three concentric zones have a diameter half that of the central sub-aperture, the plurality of peripheral sub-apertures at the second distance from the central aperture in the second concentric zone among the three concentric zones have the diameter one third that of the central sub-aperture, and the plurality of peripheral sub-apertures at the third distance from the central aperture in the third concentric zone among the three concentric zones have the diameter one-fourth that of the central sub-aperture.

3. The optically sparse primary aperture of claim 1, wherein the plurality of peripheral sub-apertures is equally distributed in the three concentric zones and size of the plurality of peripheral sub-apertures in each of the three concentric zones is reduced such that, the plurality of peripheral sub-apertures at the first distance from the central sub-aperture in the first concentric zone among the three concentric zones have a diameter equal to one-third of the central sub-aperture, the peripheral sub-apertures at the second distance from the central sub-aperture in the second concentric zone among the three concentric zones have the diameter equal to one-fifth that of the central sub-aperture, and the plurality of peripheral sub-apertures at the third distance from the central sub-aperture in the third concentric zone among the three concentric zones have the diameter equal to one-seventh that of the central sub-aperture.

* * * * *